United States Patent [19]

Fast

[11] Patent Number: 5,664,173
[45] Date of Patent: Sep. 2, 1997

[54] METHOD AND APPARATUS FOR GENERATING DATABASE QUERIES FROM A META-QUERY PATTERN

[75] Inventor: Ronald Wayne Fast, Bellevue, Wash.

[73] Assignee: Microsoft Corporation, Redmond, Wash.

[21] Appl. No.: 562,916

[22] Filed: Nov. 27, 1995

[51] Int. Cl.$^6$ .................................................. G06F 17/30
[52] U.S. Cl. ........................................ 395/604; 395/751
[58] Field of Search .................................. 395/600, 161, 395/603, 604, 605, 601, 751; 364/300, 419

[56] References Cited

U.S. PATENT DOCUMENTS

| | | | |
|---|---|---|---|
| 3,763,474 | 10/1973 | Freeman et al. | 340/172.5 |
| 4,506,326 | 3/1985 | Shaw et al. | 364/300 |
| 4,688,195 | 8/1987 | Thompson et al. | 364/300 |
| 5,031,124 | 7/1991 | Bosinoff et al. | 364/551.01 |
| 5,133,068 | 7/1992 | Crus et al. | 395/600 |
| 5,197,005 | 3/1993 | Shwartz et al. | 364/419 |
| 5,315,709 | 5/1994 | Alston, Jr. et al. | 395/600 |
| 5,347,647 | 9/1994 | Allt et al. | 395/575 |
| 5,386,550 | 1/1995 | Hedin et al. | 395/600 |
| 5,519,859 | 5/1996 | Grace | 395/600 |
| 5,528,748 | 6/1996 | Wallace | 395/183.01 |
| 5,537,590 | 7/1996 | Amado | 395/600 |
| 5,550,971 | 8/1996 | Brunner et al. | 395/161 |
| 5,574,898 | 11/1996 | Leblang et al. | 395/601 |

OTHER PUBLICATIONS

Teach Yourself Web Publishing with HTML in a Week, Laura Lemay, pp. 1-6.
Microsoft Press Computer Dictionary 2$^{nd}$ Edition, Woodcock et al., pp. 115-116.
White et al, Test MAnager: A Regression Testing Tool, IEEE, pp. 338-347 Sep. 1993.
Paulley et al, Exploiting Uniqueness in Query Optimization, IEEE, pp. 68-79 Feb. 1994.
Stepheson et al, Imacts: An Interactive, Multiterabyte Image Archive, pp. 146-161 Sep. 1995.

*Primary Examiner*—Thomas G. Black
*Assistant Examiner*—Frantz Coby
*Attorney, Agent, or Firm*—Duft, Graziano & Forest, P.C.

[57] ABSTRACT

A grammar, parsing method, and associated apparatus for automatically generating test commands to test an SQL database engine interface while reducing storage requirements and improving access time for such test commands as compared with prior test tools. The test tools and methods include a grammar for concise syntactic representation of a meta-query (also referred to as meta-language statement, query pattern, or query template). The meta-query defines an statement similar to the SQL language but includes query elements and query list elements used to generate a plurality of SQL test commands to be applied to the SQL database engine under test. Test commands are generated from the meta-query to reduce storage requirements of prior test methods. Query elements are variable space holders in the meta-query and are replaced by a value appropriate to the SQL database engine under test when the meta-query is used to generate test commands. Query list elements define a list of values to be inserted in place of the query list element when generating the test commands from the meta-query.

9 Claims, 7 Drawing Sheets

FIG. 1 *PRIOR ART*

METHOD AND APPARATUS FOR GENERATING DATABASE QUERIES FROM A META-QUERY PATTERN

FIELD OF THE INVENTION

This invention relates to the testing of database software systems and in particular to the testing of database engine drivers in an Open DataBase Connection (ODBC) database environment by the automatic generation of test commands from a meta-query pattern.

PROBLEM

The computing structures and methods of the present invention are built upon open standard database Application Program Interfaces (APIs—also referred to herein as database management interface means) such as Microsoft's ODBC or X/Open's DATA MANAGEMENT: SQL CALL LEVEL INTERFACE (X/Open Preliminary Specification P303 ISBN 1-85912-015-6 - was previously publication S203 - will become publication C451 available from X/Open Company Ltd, Berks, United Kingdom). These standards permit client/server database application programs to be designed in accord with a common, standardized API while utilizing any underlying database engine which conforms to these standards for the permanent physical storage of the managed information. End user installations using the present invention may therefore utilize any presently installed database management subsystem. The SQL (Structured Query Language) has been widely adopted as a de facto standard interface for the specification of database queries (and related data management commands). The ODBC API therefore enforces a standardized SQL query language and performs any translations necessary for operation of a query upon a specific database engine (database management subsystem). This hierarchical API structure permits the application programmer to adhere to a single database/query architecture and yet easily adapt (port) the application program to the unique requirements of a particular database engine through the ODBC API library functions.

In testing such a standard database API, a test process must generate a large number of test commands for each database engine supported by the API. For example, a large set of test commands is applied to Microsoft's ODBC API in order to test its use in conjunction with the dBase database engine. Yet another large set of test commands is needed to test ODBC when used in conjunction with the Access or Paradox database engines, etc. Though there is substantial similarity in these plural sets of test commands, there are invariably minor differences in syntax or semantics between the queries generated for each unique database engine. For example, some database engines support atomic data types which are unique to the engine. Or, for example, the size limits for certain data types may vary among various database engines. In view of these differences, prior test methods and tools for generating test commands for database API subsystems have created large sets of test commands and commands and stored them in a query database to be retrieved when the corresponding database engine is tested with the ODBC API. Each test command is "hard-coded" for the specific database engine to which it corresponds. The query database which stores these commands can therefore be quite large. As such, as with any large database, access to the database for purposes of extracting test commands to perform a particular test sequence can be quite time consuming. Adding, deleting or modifying test commands stored in the large query database can also be time consuming due to re-indexing operations associated with the changes in the query database.

An additional problem with the query database techniques taught by prior test products and methods arises from the fact that the query database is itself another database which must be operated in the same computing platform on which the test commands are being applied to the ODBC API. Whatever DBMS package is used for the storage of the test commands in the query database must be available on, or ported to, the computing platform on which the ODBC/database engine combination is being tested. This porting effort may add a substantial workload to the ODBC test efforts if the DBMS selected for the query database storage is not presently available on the computing platform presently being tested.

In view of the above discussions, it is clear that there exists a need for methods and apparatus for managing and manipulating test commands to be used in testing an ODBC/database engine combination which improves speed of access to the test commands, eases the modification of the commands, and reduces the storage requirements for the storage of the test commands.

SOLUTION

The present invention solves the above identified problems and other problems to thereby advance the state of the useful arts by providing methods and associated apparatus for generating SQL test commands from a query pattern (also referred to herein as query template, meta-query, or simply meta-language statement). The query pattern is formed according to the syntax of a meta-language of the present invention to define a set of SQL test commands in a concise syntactic statement. Each meta-language test command pattern (a meta-query) is parsed by the methods of the present invention to generate all test commands in the set defined by the meta-query. The SQL test commands so generated are then applied to the database engine under test.

The meta-language of the present invention permits test commands to be expressed in a concise, compact meta-language syntax. Storage and modification of the concise, compact meta-queries is simpler, faster, and requires significantly less storage capacity as compared to the prior techniques wherein all individual test commands are stored in a test database. The meta-queries are stored in a standard text file and may therefore be accessed or modified by any of several well known techniques for viewing and modifying text files.

The meta-language of the present invention expresses the meta-queries according to the rules of a grammar definition. The grammar definition includes "query elements" and "query list elements." The query elements serve as variable place holders in the SQL test commands specified by the meta-query. When the meta-query is processed to generate test commands, the query element placeholder is replaced by a variable value appropriate for the database engine being tested. Query list elements provide a list of values to be substituted into the generated test commands as each test command is generated. When a query list element is specified in a meta-query, at least one query is generated for each element in the query list element. If multiple query list elements are specified in a meta-query, then a test command is generated for each unique combination generated by selecting one of the elements in each of the multiple query list elements.

The syntax of the meta-language is clearly and completely defined by a simple BNF style specification as compared to a complex database structure used by prior methods to store and retrieve the set of test commands appropriate to the database engine under test. The BNF definition defines the rules for construction and generation of meta-language commands the semantic interpretation of which is used to generate a set of SQL test commands.

DETAILED DESCRIPTION OF THE INVENTION

Figure 1:
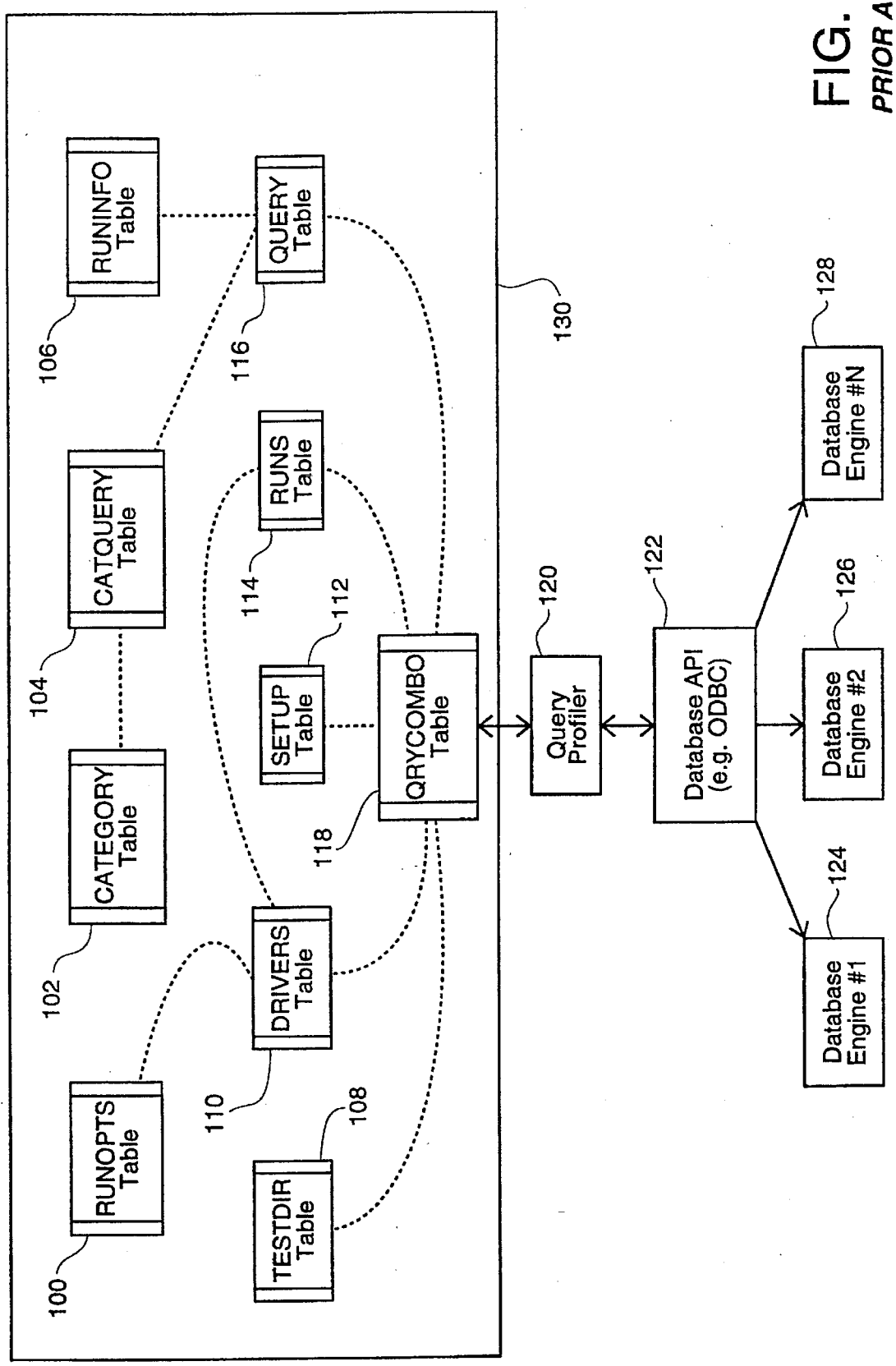
FIG. 1 is a block diagram of a typical test environment known in the art for testing a database API (e.g. Microsoft's ODBC)

OVERVIEW:

FIG. 1 is a block diagram of an approach to testing the database API (such as Microsoft's ODBC) in conjunction with a chosen database engine. Query profiler 120 generates test SQL commands and applies the generated test commands to the database API 122 to be tested. The commands generated are intended to test the database API 122 for proper operation in conjunction with one of the plurality of database engines 1 through N (124, 126, and 128). In accord with the known methods for implementing query profiler 120, test database 130 is constructed and maintained to contain all possible query commands and associated options for the generation of all test SQL queries applicable to all database engines 124, 126, and 128 associated with database API 122.

The precise structure of test database 130 may be specific to each database API 122 or specific to the needs of the database engines 124, 126, and 128 to be used in conjunction with the API 122. Therefore, the detailed structure of test database 130 is not relevant to an overall understanding of the operation of known prior techniques. Tables 100–118 are intended only as an exemplary database structure to demonstrate the complexity of prior approaches. The various tables and relationships depicted in FIG. 1 are used to define and store the various commands needed to setup a particular ODBC environment for testing a particular ODBC driver, to store the various command options and command parameters, and to store the test commands themselves, among other information. The complex of the test database grows dramatically as additional options, parameters, configurations and environments are added to the testing of each ODBC driver.

Figure 2:
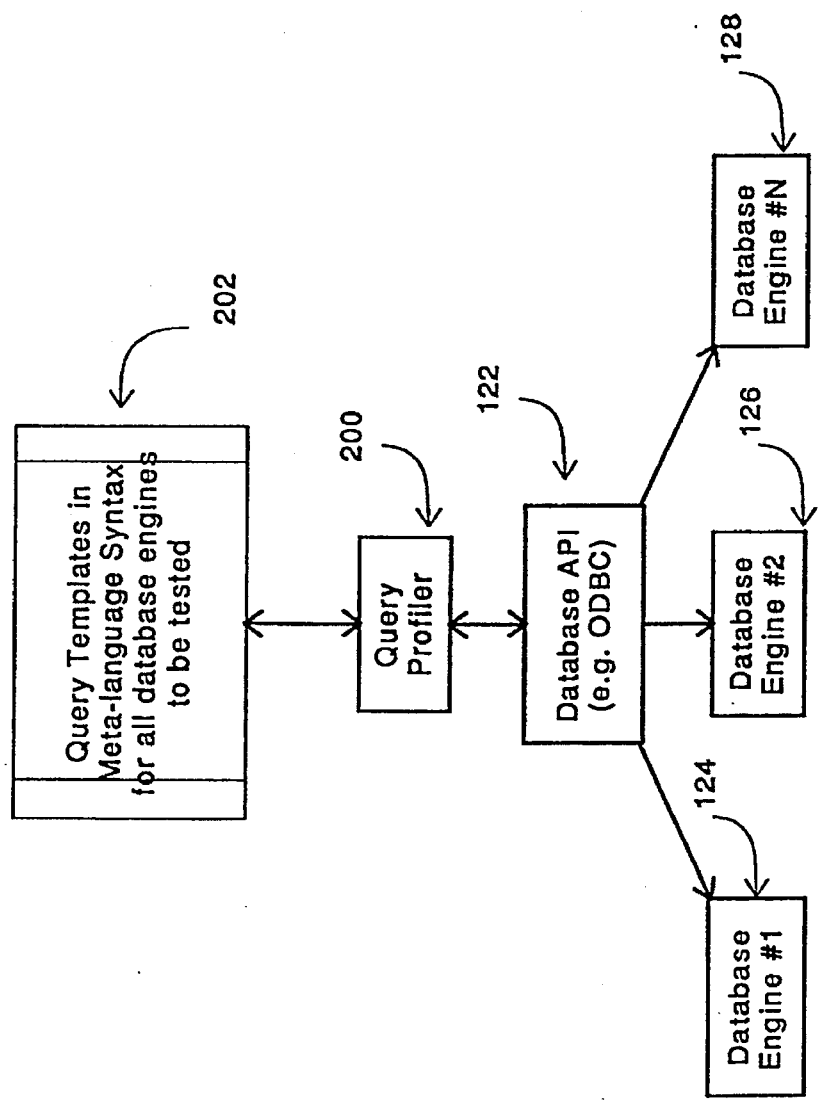
FIG. 2 is a block diagram of the database API test environment of the present invention which utilizes a meta-language syntax to represent large numbers of test commands.

FIG. 2 is a block diagram of a query profiler 200 which utilizes the structures and methods of the present invention.

Database API 122 and the database engines 124, 126, and 128 are identical to those of FIG. 1. Query profiler 200 of FIG. 2 retrieves and processes the meta-language statements (query templates) from the query templates file 202. Each meta-language statement in the query templates file 202 may define a plurality of test commands to be generated by the query profiler 200. The query templates file 202 is a simple text file which may be easily constructed and maintained by any of several well known tools for manipulating text files. The storage space required to store the query templates file 202 is significantly reduced as compared to the storage requirements for equivalent the test database 130 of FIG. 1.

META-LANGUAGE SYNTAX AND SEMANTICS:

The meta-language of the present invention may be viewed as a set of grammatical rules for constructing statements used by the query profiler 200 of FIG. 2 to generate test SQL commands. The meta-language is substantially similar to the well known SQL query language with elements added to define rules for the construction of actual SQL statements. A typical SQL query command, for example, consists essentially of the following syntax:

SELECT column FROM tables WHERE condition where: column is replaced by one or more column names, tables is replaced by one or more table names, and condition is replaced by a logical expression which must evaluate to true for each row to be selected from the tables. The result of the SQL query is a table constructed of the identified columns and the rows selected by virtue of the logical expression evaluating true for those rows. Some database engines provide for additional elements to be named in the identifying columns or tables or in the logical condition expression. For example, parameters which further control the search capability in the engine's data management or specific limitations or additions relating to types of supported data are frequently added to the features of a specific database engine. Such additional elements are frequently unique to the specific database engines supported by the database API. To thoroughly test a database API (such as Microsoft's ODBC) requires testing not only the features common to all supported database engines, but also requires the testing of features unique to each supported database engine. Testing these database engine specific features in conjunction with the database API requires the creation of a large number of specialized command options.

The present invention defines a meta-language syntax and grammar which builds upon the syntax of standard SQL commands. The meta-language syntax adds variable elements to the SQL command syntax. When "parsed" by the query profiler 200 (of FIG. 2) of the present invention, these variable elements in the meta-language commands are replaced by actual values and the resultant SQL commands are thereby generated from the meta-language statements (without the variable element syntax embedded). The generated SQL commands are then applied to the database API 122 to test its proper operation in conjunction with one of the database engine drivers (124, 126, or 128). The variable elements of the meta-language statement can specify one or more actual values to use in the generation of test SQL commands and may therefore compactly represent a large volume of generated test SQL commands. Such large volumes of test SQL commands previously required significant mass storage capacity and associated complexity to store and retrieve the several SQL command sets required to test the database API 122 operation.

Processing of the meta-language statements by the query profiler 200 (of FIG. 2) automatically generates the test SQL commands represented by the meta-language statements for every data type supported by the specific database engine driver under test (124, 126, or 128 of FIG. 2). The query profiler 200 detects the data types supported by the database engine through standard function calls of the database API 122. Such interface function calls to the API are well known to those of ordinary skill in the art and are clearly described in the public documentation available with the API (such as Microsoft's ODBC database API). The query profiler 200 then loops through the processing of the meta-language statements to generate test SQL commands once for each supported data type.

The variable element of the meta-language adds "query elements" to the SQL query command syntax which are replaced in generation of the test commands by actual values appropriate to the database engine (124, 126, and 128 of FIG. 1) under test with the database API 122 of FIG. 2. The query elements are identified by query element identifiers (name strings for example) and are delimited in the meta-language statement by angled braces ("<" preceding the query element identifier and ">" following the query element identifier). The following Table 1 provides exemplary query elements presently contemplated in the best known mode of the present invention. One of ordinary skill in the art will readily recognize that this list may be extended to include other query elements which hold the place of language elements in the generated SQL queries and are unique to the database engine drivers.

TABLE 1

| Query Element | Replacement Information |
| --- | --- |
| <qualifier> | The current qualifier for the database engine driver under test (i.e. the ODBC connection option - SQL_CURRENT_QUALIFIER) |
| <tableN> | Name of a table in test data for the SQL command (where N is a number from 1 through the number of tables in the test data) |
| <columnN> | Name of a column in a table in the test data for the SQL command (where N is a number from 1 through the number of columns in the associated table) |
| <alias> | Name of an alias for a column in the test data for the SQL command |
| <data> | A constant data value for use in the SQL command |
| <column name> | Name of generated column (i.e. one that doesn't currently exist in the created table and used in the "ALTER TABLE" queries so that the column name won't conflict with an existing column name) |
| <column def> | Data type of the <column name> element |

The meta-language (query templates/query patterns) of the present invention also includes "query list elements" which, when used in a meta-language statement, cause the generation of a plurality of SQL commands; one for each element in the query element list. This feature of the meta-language permits the compact representation of a large set of test commands in a concise, single, meta-language statement. This representation of a collection of test commands is simpler to maintain or modify and requires significantly less storage than the methods employed in the past to test a database API.

A query list element provides a list of alternate values to be used in generating test commands from the meta-language statement (query template). Each of the alternate values in the query list element is used to replace the query list element in the generation of one (or more) test commands. In other words, a query list element that indicates four alternate values will generate (at least) four test commands, (at least) one each for each of the four alternate values in the query list element. If multiple query list elements are included in a meta-language statement, then the query profiler (200 of FIG. 2) will generate a test command for each combination of the elements in all the query list elements of the statement.

Query list elements are replaced in generation of the test command by the alternate values supplied in the query list element when test commands are generated to test the database API 122. The query list elements are comma separated values delimited by a pair of square braces (a "[" preceding the list and a "]" following the list). The following Table 2 provides exemplary query list elements presently contemplated in the best known mode of the present invention. One of ordinary skill in the art will readily recognize that this exemplary list may be extended to include other query list elements which hold the place of language elements in the generated SQL queries.

TABLE 2

| Query List Element | Replacement Information |
| --- | --- |
| [=,<,<=,>,>=,!=,!<,!>] | Generates eight test commands; one with each of the eight listed logical test (comparison) operators (as used in the condition clause) |
| [*=,=*] | Generates two test commands; one with each of two Microsoft SQL Server syntax outer join operators |
| [-,+,*,/,%] | Generates five test commands: one with each of the five listed arithmetic operators |
| [SQL_DATE, SQL_TIME_STAMP] | Generates two test commands: one with each of the two listed standard data types |

The following meta-language statement examples provide further clarification of the power and syntax of the meta-language for the specification of large numbers of test SQL commands. In particular it is to be noted that the meta-language may be applied to many SQL commands (not merely the "SELECT" command).

SELECT <table1>.<column1> FROM <table1>,<table2> WHERE <table>.<column1> [=,<,<=,>,>=,!=,!<,!>] <table2>.<column1>

This exemplary meta-language statement generates eight queries selecting rows from column 1 of table 1 (in the test data) where the column 1 value in table 1 of each row compares using the selected one of eight comparison operators with the same row and column of table 2. The eight generated queries are:

SELECT <table1>.<column1> FROM <table1>,<table2> WHERE <table1>.<column1> = <table2>.<column1>
SELECT <table1>.<column1> FROM <table1>,<table2> WHERE <table1>.<column1> < <table2>.<column1>
SELECT <table1>.<column1> FROM <table1>,<table2> WHERE <table1>.<column1> <= <table2>.<column1>
SELECT <table1>.<column1> FROM <table1>,<table2> WHERE <table1>.<column1> > <table2>.<column1>
SELECT <table1>.<column1> FROM <table1>,<table2> WHERE <table1>.<column1> >= <table2>.<column1>
SELECT <table1>.<column1> FROM <table1>,<table2> WHERE <table1>.<column1> != <table2>.<column1>
SELECT <table1>.<column1> FROM <table1>,<table2> WHERE <table1>.<column1> !< <table2>.<column1>
SELECT <table1>.<column1> FROM <table1>,<table2> WHERE <table1>.<column1> !> <table2>.<column1>

In addition, the query profiler 200 of FIG. 2 will generate these eight test commands for all data types supported by the selected database engine driver (124, 126, or 128 of FIG. 2). For example, Microsoft Access version 2.0 supports 15 distinct data types. Therefore, this exemplary meta-language statement generates 8*15 or 120 test commands when testing the database API 122 in conjunction with a Microsoft Access database engine driver.

As a further example, consider:

CREATE INDEX <table 1 > ON <table 1 > ( <column name> ASC ) WITH IGNORE NULL

This exemplary meta-language statement generates a new table index with a column name appropriate to the data type currently being processed by the query profiler 200. As noted above, Microsoft Access, for example, supports 15 data types and therefore, this meta-language statement generates 15 SQL commands when testing the database API 122 in conjunction with the Microsoft Access database engine driver.

Figure 3:
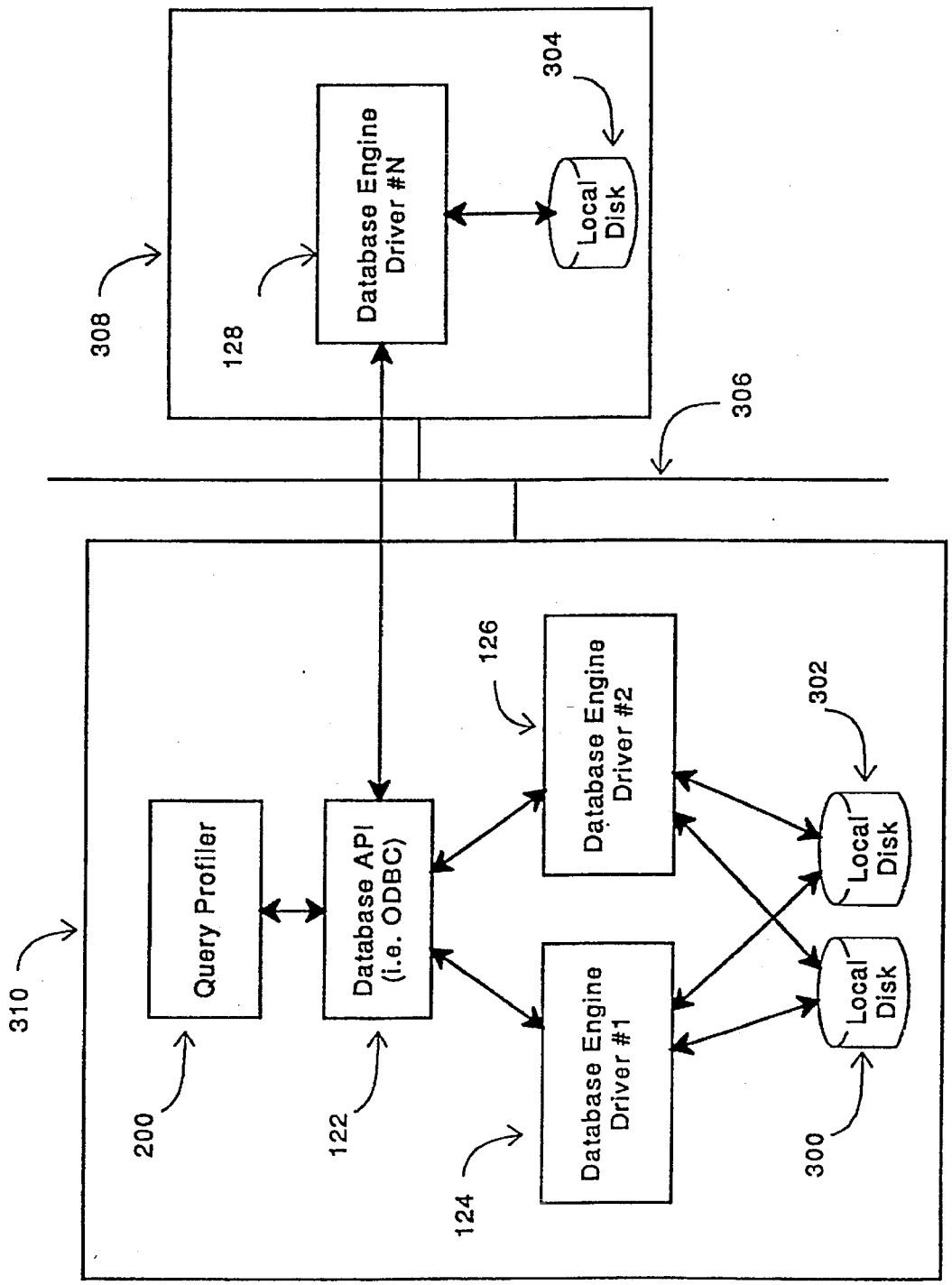
FIG. 3 is a block diagram of a computing environment in which the test environment of the present invention operates.

QUERY PROFILER:

Query profiler 200 of FIG. 2 is operable on a data processing system to parse the meta-language statements and to generate test SQL commands for application to the database API 122. FIG. 3 is a block diagram depicting a typical computing environment in which query profiler 200 operates. Data processing system 310 provides the central processing, memory, and mass storage components for operation of query profiler 200, database API 122, and database engine drivers 124 and 126. Database engine drivers 124 and 126 store and retrieve information on local disks 300 and 302. Data processing system 310 may be connected to other data processing systems 308 over network attachment 306. Additional database engine drivers 128 and local disks 304 may reside within the data processing system 308. Database API 122 may interact with a remote database engine driver 128 through any of several well known network computing architectures. Further, one of ordinary skill in the computing arts will readily recognize that the computing environment depicted in FIG. 3 is only exemplary of one such architecture in which the structures and methods of the present invention may operate. The present invention is equally applicable to computing environments without networked connections to other data processing system or to distributed computing environment utilizing other topological configurations or connectivity technologies.

Figure 4:
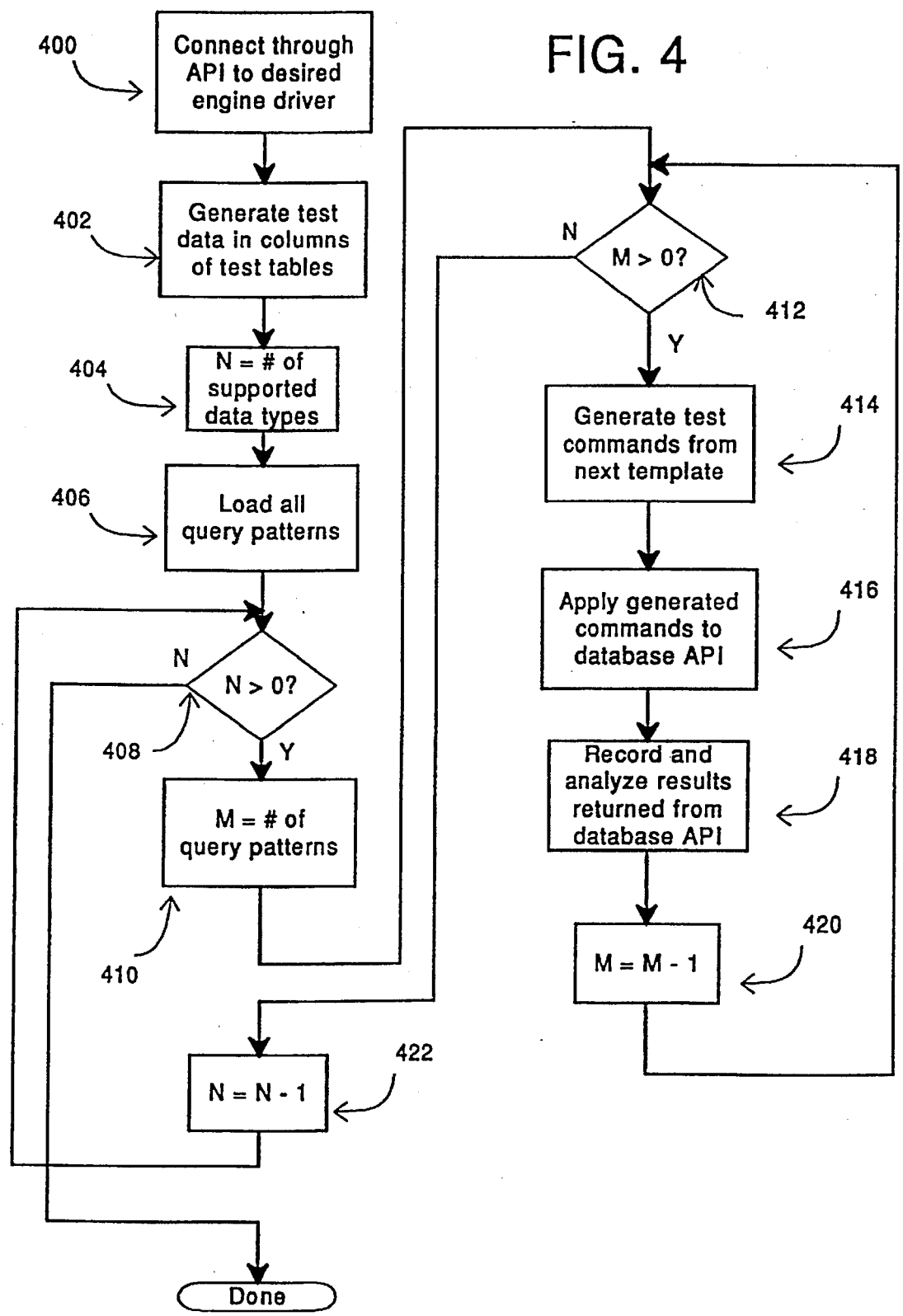
FIG. 4 is a flowchart describing the operation of the query profiler in accord with the methods of the present invention.

FIG. 4 is a flowchart depicting the methods of the present invention as implemented by the query profiler 200. Element 400 of FIG. 4 invokes functions in the database API (122 of FIG. 2) required to associate the test procedure with a particular database engine driver module under test (124, 126, or 126 of FIG. 2). Element 402 then generates test data in tables created and managed by the database engine driver under test. This test data is used by the selected database engine 124, 126, or 128 through the database API 122 at the direction of the query profiler 200 in its interpretation of the meta-language statements. Since the query profiler generates the test data, it can predict the expected result of each SQL command generated from the meta-language statements and applied to the database API and engine. The specific form of the generated tables is a matter of design choice made by the test engineering staff in creating the test procedures. One or more tables may be created and each table may have one or more columns as desired by the test engineers to adequately test the database API interface to the database engine driver.

Elements 404 and 406 initialize for the looping functions performed by elements 408–420. The test SQL commands generated for testing the API interface to the engine are generated for each data type supported by the underlying database engine. Element 404 sets the variable "N" to the number of data types supported by the selected database engine. Element 406 loads all the query patterns from a text file in which they are stored. The query patterns are previously designed by the test engineers to compactly specify the voluminous test commands required to adequately test the interface between the database API and a database engine driver module. As discussed above, the query patterns are written in simple textual form in the syntax of the meta-language discussed above. Element 406 serves to read the text file storing the pre-defined query patterns in preparation for parsing the meta-language statements and generating the specified SQL commands therein.

Elements 408–422 are repetitively operable for each data type supported by the selected database engine driver. Element 408 tests whether the counter variable "N" (indicating the number of supported data types) has been decremented to zero. On each iteration of the loop (elements 408–422), element 422 is operable to decrement the counter variable "N." Elements 410–420 are therefore operable to generate the test commands specified by all query patterns for a single data type supported by the selected database engine driver.

Element 410 sets the variable "M" to the number of query patterns pre-defined by the test engineers in the text file. In other words, the number of records to be processed in the meta-language file. Each record provides another query pattern in the meta-language syntax described above. Each record is therefore processed in turn to generate all the test SQL commands required to test the database API in conjunction with the selected database engine driver.

Elements 412–420 are repetitively operable for each record (meta-language statement or query pattern) retrieved from the text file. Element 412 tests whether the counter variable "M" (indicating the number of meta-language statements in the text file) has been decremented to zero. On each iteration of the loop (elements 412–420), element 420 is operable to decrement the counter variable "M." Elements 414–418 are therefore operable to generate the test commands specified a single query patterns for a single data type supported by the selected database engine driver.

Element 414 parses the meta-language statement to process all query elements and query list elements. Parsing of the meta-language statement includes locating all query elements and replacing them by values appropriate to the particular data type presently being processed and as appropriate for the selected database engine driver. Additionally, the parsing process locates any query list elements in the meta-language statement and generates one SQL command for each element in the list. Each of the generated SQL commands are thereby generated by substitution of actual values for the variable elements of the meta-language statement.

Element 416 then applies the SQL commands generated by element 414 to the database API 122. The SQL commands so applied are in turn transformed and transferred to the selected database engine driver 124, 126, or 128 of FIG. 2 for actual processing upon the test data stored on the mass storage devices (300, 302, and 304 of FIG. 3). Element 418 captures, records, and analyzes the results of the SQL command processing returned by the database engine driver. Processing of these results is discussed below in additional detail.

As noted above, element 420 is next operable to decrement the Loop counter variable "M" and element 422 decrements the loop counter variable "N" to control the iterative looping of the method. When element 412 determines that all records in the meta-language text file have been processed, it returns control to element 422 to process another supported data type. Likewise, when element 408 determines that all supported data types have been processed, the method completes processing.

Figure 5:
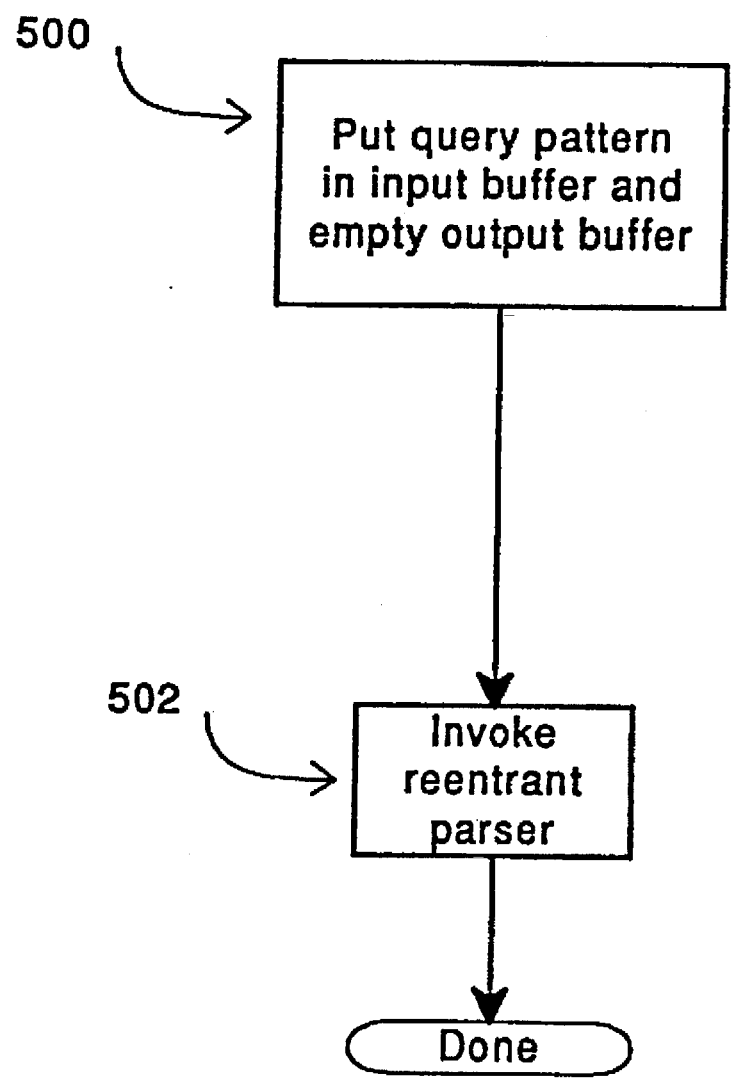
FIG. 5 is a flowchart which depicts addition detail of the method shown in FIG. 4.
Figure 6:
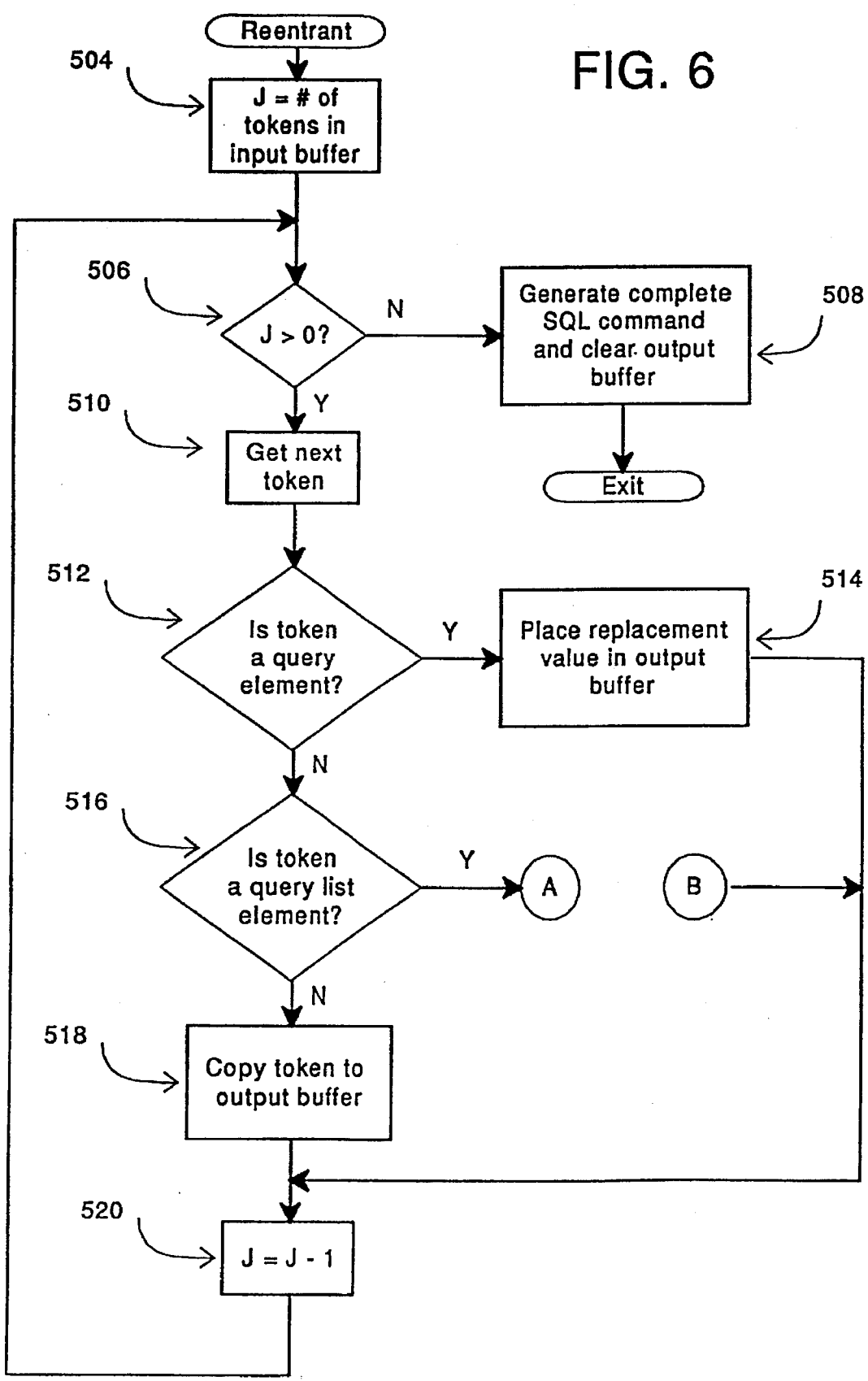
FIG. 6 is the first half of a flowchart of the reentrant parser of the present invention which generates test commands from meta-language statements.
Figure 7:
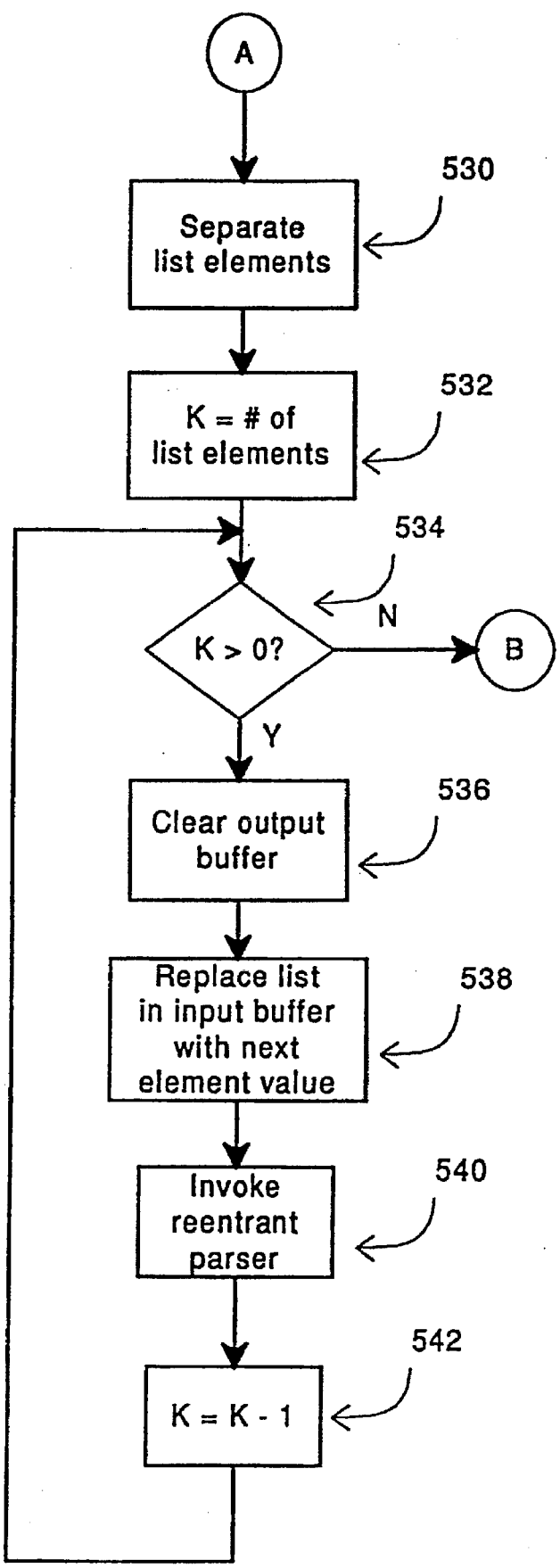
FIG. 7 is the second half of a flowchart of the reentrant parser of the present invention which generates test commands from meta-language statements.

FIGS. 5-7 combine to provide a flowchart providing additional detail of the operation of element 414 of FIG. 4 which generates all SQL commands from a single query template (meta-language statement). Element 500 of FIG. 5 places the query pattern (meta-language statement) to be parsed into a memory input buffer. Element 502 of FIG. 5 then initially invokes the reentrant parser to parse the tokens of the meta-language statement. Tokens in the meta-language statement (query pattern or template) are, in their simplest form, fields of non-space characters separated by spaces. Each token is therefore either a query element (if it is delimited by angle braces), or a query list element (if it is delimited by square braces), or is a constant textual string which forms a constant portion of the desired SQL command to be generated. There may be a plurality of query elements or query list elements in a single meta-language statement. In addition, the elements of a query list element may themselves be other query elements or query list elements (i.e. nested variable portions of the query template). For this reason, the parser of the query profiler of the present invention is reentrant so as to permit parsing of nested variable elements within the template.

FIG. 6 depicts the details of the reentrant parser of the query profiler. The parser is entered in a reentrant manner: i.e. saving previous status and allocating local variables on a stack. Element 504, sets the counter variable "J" to the number of tokens found in the input buffer counter varible J is provided as a parameter to the reentrant function. Elements 506 and 520 are operable to loop on the invocation of elements 510-518 (and 530-542 of FIG. 7 below) for each token found in the input buffer. If element 506 determines that all tokens in the input buffer have been processed, element 508 is operable to generate the completed SQL command in the output buffer. The completed command is then applied to the database API (122 of FIG. 2) as discussed above with respect to FIG. 4. If further tokens remain to be processed, element 510 is operable to get the next token from the input buffer for further processing.

Element 512 determines if the token to be processed is a query element type of token (i.e. delimited by angle braces). If so, element 514 is operable to copy the replacement value for the query element (as discussed above) into the output buffer. This replacement value stands in place of the query element in the SQL command being generated from the query template. Processing then continues at element 520 by looping through the process.

If the token is not a query element, the element 512 determines whether the token is a query list element (i.e. delimited by square braces). If not, the token must be a constant portion of the query pattern and so is simply copied to the output buffer to become a constant part of the generated SQL command. If the token is a query list element, processing continues at element 530 of FIG. 7.

Element 530 of FIG. 7 separates the query list elements into the individual values (the comma separated values of the list). Element 532 sets the counter variable "K" to the number of value elements in the list. If element 534 determines that there are no more values in the list to be processed, then processing continues by returning to element 520 of FIG. 6.

For each value in the list, elements 534-542 are invoked to generate an SQL command in the output buffer. Element 536 first clears the output buffer generated up to this point (by earlier operation of elements 506-520 of FIG. 6). Next, element 538 creates a new input buffer with the current input buffer but with the query list element (now being processed) replaced by the next value from the list Element 540 then invokes the reentrant parser function to re-parse the new input buffer with the currently processed query list element replaced by its next value from the list. After processing of the revised meta-language statement (the new input buffer) is complete, and the associated SQL commands are generated, processing continues in the present invocation of the parser with element 542 decrementing the loop count variable "K" to indicate another value in the list is processed. Upon completion of the processing of the present query list element, processing continues at element 520 if FIG. 6 to process the remaining tokens of the meta-language statement.

Processing continues in this manner for each value in the query list element until all SQL commands represented by the query pattern (meta-language statement) have been generated. One of ordinary skill in the art will recognize that other forms of recursive of reentrant designs of the method of the present invention may achieve the same purpose. Such design choices for reentrant or recursive methods are well known to those of ordinary skill in the software arts. In addition, the methods of the present invention may be simplified by restricting the meta-language syntax to prohibit the nesting of, or even a plurality of, query list elements. Such a design choice eliminates the need for recursion in the processing of the meta-language. Again, such design choices are well known to those of ordinary skill in the software arts.

BNF DESCRIPTION OF GRAMMAR RULES:

The meta-language of the present invention may be understood as a set of grammatical rules for the formation of legal statements within the grammar. A BNF format description is a common format in which to express such rules. The following BNF rule description includes the entire SQL standard language grammatical rules from which the rules of the present invention are an extension. The extensions to the SQL grammar defined by the rules of the present invention are highlighted in bold characters to distinguish them from the standard rules which comprise the standard SQL language. For added clarity, the enhancements to the SQL BNF grammar rules all have identifiers that begin with the characters "QP".

Elements used in SQL Statements:

```
all-function ::= {AVG | MAX | MIN | SUM} (expression)
approximate-numeric-literal ::= mantissaEexponent
approximate-numeric-type ::= {approximate numeric types}
argument-list ::= expression | expression, argument-list
base-table-identifier ::= QP-base-table-name
base-table-name ::= base-table-identifier
    | owner-name.base-table-identifier
    | qualifier-name qualifier-separator base-table-identifier
    | qualifier-name qualifier-separator [owner-name].base-table-identifier
between-predicate ::=
    expression [NOT] BETWEEN expression AND expression
binary-literal ::= {implementation defined }
binary-type ::= {binary types}
bit-literal ::= 0 | 1
bit-type ::= {bit types}
boolean-factor ::= [NOT] boolean-primary
boolean-primary ::= predicate | ( search-condition )
boolean-term ::= boolean-factor [AND boolean-term]
character ::= {any character in the implementor's character set}
character-string-literal ::= '{character}...'
character-string-type ::= {character types}
column-alias ::= QP-alias
column-identifier ::= QP-column-identifier
```

1001/006

```
     column-name ::= [table-name.]column-identifier
     column-name ::= [{table-name | correlation-name}.]column-identifier
     comparison-operator ::= < | > | <= | >= | = | <>
     comparison-predicate ::= expression comparison-operator expression
  5  comparison-predicate ::= expression QP-comparison-list expression
     comparison-predicate ::= expression QP-outer-join-list expression
     comparison-predicate ::=
            expression comparison-operator {expression | (sub-query)}
     correlation-name ::= QP-alias
 10  cursor-name ::= QP-cursor-name
     data-type ::= character-string-type
     data-type ::=
            character-string-type
            | exact-numeric-type
 15         | approximate-numeric-type
     data-type ::=
            character-string-type
            | exact-numeric-type
            | approximate-numeric-type
 20         | bit-type
            | binary-type
            | date-type
            | time-type
            | timestamp-type
 25  date-separator ::= -
     date-type ::= {date types}
     date-value ::=
            years-value date-separator months-value date-separator days-value
     date-value ::=
 30         QP-sql-date-time-list
     days-value ::= digit digit
     digit ::= 0 | 1 | 2 | 3 | 4 | 5 | 6 | 7 | 8 | 9
     distinct-function ::=
            {AVG | COUNT | MAX | MIN | SUM} (DISTINCT column-name)
 35  dynamic-parameter ::= ?
     empty-string ::=
     escape-character ::= character
     exact-numeric-literal ::=
            [+|-] { unsigned-integer[.unsigned-integer ]
 40         | unsigned-integer.
            | .unsigned-integer }
     exact-numeric-type ::= {exact numeric types}
     exists-predicate ::= EXISTS ( sub-query )
     exponent ::= [+|-] unsigned-integer
 45  expression ::= term | expression {+|-} term
     expression ::= term | expression QP-math-operation-list term
```

17

1001/006

```
factor ::= [+|-]primary
hours-value ::= digit digit
index-identifier ::= QP-index-name
index-name ::= [index-qualifier.]index-identifier
index-qualifier ::= QP-index-qualifier
in-predicate ::= expression [NOT] IN {(value {, value}...) | (sub-query)}
insert-value ::=
        dynamic-parameter
        | literal
        | NULL
        | USER
keyword ::=
        (see list of reserved keywords)
length ::= unsigned-integer
letter ::= lower-case-letter | upper-case-letter
like-predicate ::= expression [NOT] LIKE pattern-value
like-predicate ::=
        expression [NOT] LIKE pattern-value [ODBC-like-escape-clause]
literal ::= character-string-literal
literal ::= character-string-literal | numeric-literal
literal ::= character-string-literal
        | numeric-literal
        | bit-literal
        | binary-literal
        | ODBC-date-time-extension
lower-case-letter ::=
        a | b | c | d | e | f | g | h | i | j | k | l | m | n | o | p | q | r | s | t | u | v | w |
x | y | z
mantissa ::= exact-numeric-literal
minutes-value ::= digit digit
months-value ::= digit digit
null-predicate ::= column-name IS [NOT] NULL
numeric-literal ::= exact-numeric-literal | approximate-numeric-literal
ODBC-date-literal ::=
        ODBC-std-esc-initiator d 'date-value' ODBC-std-esc-terminator
        | ODBC-ext-esc-initiator d 'date-value' ODBC-ext-esc-terminator
ODBC-date-time-extension ::=
        ODBC-date-literal
        | ODBC-time-literal
        | ODBC-timestamp-literal
ODBC-like-escape-clause ::=
        ODBC-std-esc-initiator escape 'escape-character'
            ODBC-std-esc-terminator
        | ODBC-ext-esc-initiator escape 'escape-character'
            ODBC-ext-esc-terminator
```

1001/006

```
    ODBC-time-literal ::=
           | ODBC-std-esc-initiator t 'time-value' ODBC-std-esc-terminator
           | ODBC-ext-esc-initiator t 'time-value' ODBC-ext-esc-terminator
    ODBC-timestamp-literal ::=
5          | ODBC-std-esc-initiator ts 'timestamp-value' ODBC-std-esc-terminator
           | ODBC-ext-esc-initiator ts 'timestamp-value' ODBC-ext-esc-terminator
    ODBC-ext-esc-initiator ::= {
    ODBC-ext-esc-terminator ::= }
    ODBC-outer-join-extension ::=
10         ODBC-std-esc-initiator oj outer-join ODBC-std-esc-terminator
           | ODBC-ext-esc-initiator oj outer-join ODBC-ext-esc-terminator
    ODBC-scalar-function-extension ::=
           ODBC-std-esc-initiator fn scalar-function ODBC-std-esc-terminator
           | ODBC-ext-esc-initiator fn scalar-function ODBC-ext-esc-terminator
15  ODBC-std-esc-initiator ::= ODBC-std-esc-prefix SQL-esc-vendor-clause
    ODBC-std-esc-prefix ::= --(*
    ODBC-std-esc-terminator ::= *)--
    order-by-clause ::= ORDER BY sort-specification [, sort-specification]...
    outer-join ::= table-name [correlation-name] {LEFT | RIGHT | FULL}
20         OUTER JOIN{table-name [correlation-name] | outer-join} ON search-
           condition
    owner-name ::= QP-current-qualifier
    pattern-value ::= character-string-literal | dynamic-parameter
    pattern-value ::= character-string-literal | dynamic-parameter | USER
25  precision ::= unsigned-integer
    predicate ::= comparison-predicate | like-predicate | null-predicate
    predicate ::=
           between-predicate | comparison-predicate | exists-predicate
           | in-predicate | like-predicate | null-predicate | quantified-predicate
30  primary ::= column-name
           | dynamic-parameter
           | literal
           | ( expression )
    primary ::= column-name
35         | dynamic-parameter
           | literal
           | set-function-reference
           | USER
           | ( expression )
40  primary ::= column-name
           | dynamic-parameter
           | literal
           | ODBC-scalar-function-extension
           | set-function-reference
45         | USER
           | ( expression )
```

1001/006

```
procedure ::= procedure-name | procedure-name (procedure-parameter-list)
procedure-identifier ::= QP-procedure-identifier
procedure-name ::= procedure-identifier
        | owner-name.procedure-identifier
        | qualifier-name qualifier-separator procedure-identifier
        | qualifier-name qualifier-separator [owner-name].procedure-identifier
procedure-parameter-list ::= procedure-parameter
        | procedure-parameter, procedure-parameter-list
procedure-parameter ::= dynamic-parameter | literal | empty-string
ref-table-name ::= base-table-identifier
qualifier-name ::= QP-current-qualifier
qualifier-separator ::= {implementation-defined}
quantified-predicate ::= expression comparison-operator {ALL | ANY}
        (sub-query)
query-specification ::=
        SELECT [ALL | DISTINCT] select-list
        FROM table-reference-list
        [WHERE search-condition]
        [GROUP BY column-name, [column-name]...]
        [HAVING search-condition]
ref-table-name ::= base-table-identifier
        | owner-name.base-table-identifier
        | qualifier-name qualifier-separator base-table-identifier
        | qualifier-name qualifier-separator [owner-name].base-table-identifier
referenced-columns ::= ( column-identifier [, column-identifier]... )
referencing-columns ::= (column-identifier [, column-identifier]... )
scalar-function ::= function-name (argument-list)
scale ::= unsigned-integer
search-condition ::= boolean-term [OR search-condition]
seconds-fraction ::= unsigned-integer
seconds-value ::= digit digit
select-list ::= * | select-sublist [, select-sublist
select-sublist ::= expression
select-sublist ::= expression [[AS] column-alias]
        | {table-name | correlation-name}.*
set-function-reference ::= COUNT(*) | distinct-function | all-function
sort-specification ::= {unsigned-integer | column-name } [ASC | DESC]
SQL-esc-vendor-clause ::= VENDOR(Microsoft), PRODUCT(ODBC)
sub-query ::=
        SELECT [ALL | DISTINCT] select-list
        FROM table-reference-list
        [WHERE search-condition]
        [GROUP BY column-name [, column-name]...]
        [HAVING search-condition]
table-identifier ::= QP-base-table-name
table-name ::= table-identifier
```

1001/006

```
              | owner-name.table-identifier
              | qualifier-name qualifier-separator table-identifier
              | qualifier-name qualifier-separator [owner-name].table-identifier
          table-reference ::= table-name
 5        table-reference ::= table-name [correlation-name]
          table-reference ::= table-name [correlation-name]
              | ODBC-outer-join-extension
          table-reference-list ::= table-reference [,table-reference]...
          term ::= factor | term {*|/} factor
10        time-separator ::= :
          time-type ::= {time types}
          time-value ::=
              hours-value time-separator minutes-value time-separator
                   seconds-value
15        timestamp-separator ::=
              (The blank character.)
          timestamp-type ::= {timestamp types}
          timestamp-value ::= date-value timestamp-separator
                   time-value[.seconds-fraction]
20        timestamp-value ::= QP-sql-date-time-list
          unsigned-integer ::= {digit}...
          upper-case-letter ::=
              A | B | C | D | E | F | G | H | I | J | K | L | M |
              N | O | P | Q | R | S | T | U | V | W | X | Y | Z
25        user-defined-name ::= letter[digit | letter | _]...
          user-name ::= user-defined-name
          value ::= literal | USER | dynamic-parameter
          viewed-table-identifier ::= user-defined-name
          viewed-table-name ::= viewed-table-identifier
30            | owner-name.viewed-table-identifier
              | qualifier-name qualifier-separator viewed-table-identifier
              | qualifier-name qualifier-separator [owner-name].viewed-table-identifier
          years-value ::= digit digit digit digit 35        function-name ::= ODBC-string-functions |
                   ODBC-numeric-functions |
                   ODBC-time-and-date-functions |
                   ODBC-system-functions |
                   ODBC-convert-function
40
          ODBC-string-functions ::= ASCII (string-exp) |
                   CHAR(code) |
                   CONCAT(string-exp1,string-exp2) |
                   DIFFERENCE(string_exp1,string_exp2) |
45                 INSERT(string_exp1,start,length,string_exp2) |
                   LCASE(string_exp) |
```

1001/006

```
                LEFT(string_exp ,count) |
                LENGTH(string_exp) |
                LOCATE(string_exp1, string_exp2[,start]) |
                LTRIM(string_exp) |
 5              REPEAT(string_exp, count) |
                REPLACE(string_exp1, string_exp2, string_exp3) |
                RIGHT(string_exp ,count) |
                RTRIM(string_exp) |
                SOUNDEX(string_exp) |
10              SOUNDEX(count) |
                RIGHT(string_exp ,start, length) |
                RTRIM(string_exp)

string_exp ::= QP-column-identifier |
15      QP-sql-char-list |
        string-literal |
            ODBC-string-functions
    string_exp1 ::= string_exp
    string_exp2 ::= string_exp
20  length ::= QP-data-element |
        QP-sql-numeric-list |
            number |
            ODBC-numeric-functions
    start ::= QP-data-element |
25          number |
        QP-sql-numeric-list |
            ODBC-numeric-functions
    count ::= QP-data-element |
            number |
30      QP-sql-numeric-list |
            ODBC-numeric-functions ODBC-numeric-functions ::= ABS(numeric_exp) |
                ACOS(float_exp) |
35              ASIN(float_exp) |
                ATAN(float_exp) |
                ATAN2(float_exp1, float_exp2) |
        CEILING(numeric_exp) |
                COS(float_exp) |
40              COT(float_exp) |
                DEGREES(numeric_exp) |
                EXP(float_exp) |
                FLOOR(numeric_exp) |
                LOG(float_exp) |
45              LOG10(float_exp) |
                MOD(integer_exp1, integer_exp2) |
```

1001/006

```
                PI() |
                POWER(numeric_exp, integer_exp) |
                RADIANS(numeric_exp) |
                RAND([integer_exp]) |
 5              ROUND(numeric_exp, integer_exp) |
                SIGN(numeric_exp) |
                SIN(float_exp) |
                SQRT(float_exp) |
                TAN(float_exp) |
10              TRUNCATE(numeric_exp, integer_exp)

numeric_exp ::= QP-data-element |
       QP-column-identifier |
       QP-sql-numeric-list |
15         number |
           ODBC-numeric-functions float_exp ::= QP-data-element |
       QP-column-identifier |
20     QP-sql-numeric-list |
           number |
           ODBC-numeric-functions integer_exp ::= QP-data-element |
25     QP-column-identifier |
       QP-sql-numeric-list |
           number |
           ODBC-numeric-functions 30 ODBC-time-and-date-functions ::= CURDATE() |
       CURTIME() |
       DATETIME(date_exp) |
       DAYOFMONTH(date_exp) |
       DAYOFWEEK(date_exp) |
35     DAYOFYEAR(date_exp) |
       HOUR(date_exp) |
       MINUTE(date_exp) |
       MONTH(date_exp) |
       MONTHNAME(date_exp) |
40     NOW() |
       QUARTER(date_exp) |
       SECOND(date_exp) |
       TIMESTAMPADD(interval, integer_exp, timestamp_exp) |
       TIMESTAMPDIFF(interval, timestamp_exp1, timestamp_exp2) |
45     WEEK(date_exp) |
       YEAR(date_exp)
```

23

1001/006

```
date_exp ::= QP-data-element |
    QP-column-identifier |
    QP-sql-date-time-list |
        number |
        ODBC-time-and-date-functions timestamp_exp ::= QP-data-element |
    QP-column-identifier |
    QP-sql-date-time-list |
        ODBC-time-and-date-functions interval ::= SQL_TSI_FRAC_SECOND |
        SQL_TSI_SECOND |
        SQL_TSI_MINUTE |
        SQL_TSI_HOUR |
        SQL_TSI_DAY |
        SQL_TSI_WEEK |
        SQL_TSI_MONTH |
        SQL_TSI_QUARTER |
        SQL_TSI_YEAR |

ODBC-system-functions ::= DATABASE() |
        IFNULL(exp, value) |
        USER() | exp ::= column-name
exp ::= column-name QP-math-operation-list column-name
value ::= QP-data-element ODBC-convert-function ::= CONVERT(QP-column-identifier , QP-sql-data-type-list-element)
ODBC-convert-function ::= CONVERT(value-exp, data-type)

ODBC-data-type ::= SQL_CHAR |
        SQL_VARCHAR |
        SQL_LONGVARCHAR |
        SQL_DECIMAL |
        SQL_NUMERIC |
        SQL_SMALLINT |
        SQL_INTEGER |
        SQL_REAL |
        SQL_FLOAT |
        SQL_DOUBLE |
        SQL_TINYINT |
        SQL_BIGINT |
    SQL_BINARY |
    SQL_VARBINARY |
```

1001/006
```
                SQL_LONGVARBINARY |
                SQL_DATE |
                SQL_TIMESTAMP

5      ODBC-char-type ::= SQL_CHAR |
                SQL_VARCHAR |
                SQL_LONGVARCHAR ODBC-numeric-type ::= SQL_DECIMAL |
10              SQL_NUMERIC |
                SQL_SMALLINT |
                SQL_INTEGER |
                SQL_REAL |
                SQL_FLOAT |
15              SQL_DOUBLE |
                SQL_TINYINT |
                SQL_BIGINT ODBC-binary-type ::= SQL_BINARY |
20              SQL_VARBINARY |
                SQL_LONGVARBINARY ODBC-date-time-type ::= SQL_DATE |
                SQL_TIMESTAMP
25
        QP-function-name ::=      ASCII( )
        QP-procedure-identifier ::=      <index-qualifier QP-number>
        QP-index-qualifier ::=      <index-qualifier QP-number>
        QP-cursor-name ::=      <cursor QP-number>
30      QP-index-name ::= <create table QP-number>
        QP-current-qualifier ::= <qualifier>
        QP-base-table-name ::= <table QP-number>
        QP-table-extension ::= <ext>
        QP-column-identifier ::= <column QP-number>
35      QP-alias ::= <alias number>
        QP-data-element ::= <data QP-number>
        QP-column-name ::= <column name>
        QP-column-definition ::= <column def>
        QP-list ::= [QP-comparison-list |
40                      QP-outer-join-list |
                        QP-math-operation-list |
                        QP-sql-data-type-list |
                QP-sql-date-time-list |
                QP-sql-numeric-list |
45              QP-sql-char-list |
                QP-clause-list ]
```

25

1001/006

```
QP-clause-list ::= QP-clause-list-element

QP-clause-list-element ::= QP-clause-list-element |
            HAVING |
            GROUP-BY |
            ORDER-BY
QP-comparison-list ::= QP-comparison-list-element
QP-outer-join-list ::= QP-outer-join-list-element
QP-math-operation-list ::= QP-math-operation-list-element
QP-sql-data-type-list ::= QP-sql-data-type-list-element
QP-number ::= 0 | 1 | 2 | 3 | 4 | 5 | 6 | 7 | 8 | 9 | 10 ...
QP-comparison-list-element ::= comparison-list-element |
            = | < | <= | > | >= | != | !< | !
QP-outer-join-list-element ::= outer-join-list-element |
            *= | =*
QP-math-operation-element ::= QP-math-operation-element |
            - | + | * | / | %
QP-sql-data-type-list-element ::= QP-sql-data-type-list-element |
            ODBC-data-type QP-sql-date-time-list ::= ODBC-date-time-type
QP-sql-numeric-list ::= ODBC-numeric-type
QP-sql-char-list ::= ODBC-char-type
QP-sql-binary-list ::= ODBC-binary-type SQL Statements:

statement ::= alter-table-statement |
            create-index-statement |
            create-table-statement |
            create-view-statement |
            delete-statement-positioned |
            delete-statement-searched |
            drop-index-statement |
            drop-table-statement |
            drop-view-statement |
            grant-statement |
            insert-statement |
            revoke-statement |
            select-statement |
            select-for-update-statement |
        update-statement-positioned |
        update-statement-searched | alter-table-statement ::=
        ALTER TABLE base-table-name
```

26

```
1001/006
        {   ADD column-identifier data-type
        |   ADD (column-identifier data-type [, column-identifier data-type]... )
        }
alter-table-statement ::=
        ALTER TABLE base-table-name
        {   ADD column-identifier data-type
        |   ADD (column-identifier data-type [, column-identifier data-type]... )
        |   DROP [COLUMN] column-identifier [CASCADE | RESTRICT]
        } create-index-statement ::=
        CREATE [UNIQUE] INDEX index-name
        ON base-table-name
        ( column-identifier [ASC | DESC]
        [, column-identifier [ASC | DESC] ]... )

create-table-statement ::=
        CREATE TABLE base-table-name
        (column-element [, column-element] ...)
        column-element ::= column-definition | table-constraint-definition
        column-definition ::=
                column-identifier data-type
                [DEFAULT default-value]
                [column-constraint-definition[ column-constraint-definition]...]

column-constraint-definition ::=
                NOT NULL
                | UNIQUE | PRIMARY KEY
                | REFERENCES ref-table-name referenced-columns
                | CHECK (search-condition)

table-constraint-definition ::=
                UNIQUE (column-identifier [, column-identifier] ...)
                | PRIMARY KEY (column-identifier
                        [, column-identifier] ...)
                | CHECK (search-condition)
                | FOREIGN KEY referencing-columns REFERENCES
                        ref-table-name referenced-columns create-view-statement ::=
        CREATE VIEW viewed-table-name
        [( column-identifier [, column-identifier]... )]
        AS query-specification delete-statement-positioned ::=
        DELETE FROM table-name WHERE CURRENT OF cursor-name
```

1001/006

```
         delete-statement-searched ::=
             DELETE FROM table-name [WHERE search-condition]

5       drop-index-statement ::=
             DROP INDEX index-name drop-table-statement ::=
             DROP TABLE base-table-name
10               [ CASCADE | RESTRICT ]

drop-view-statement ::=
             DROP VIEW viewed-table-name
                 [ CASCADE | RESTRICT ]
15
         grant-statement ::=
             GRANT {ALL | grant-privilege [, grant-privilege]... }
             ON table-name
             TO {PUBLIC | user-name [, user-name]... }
20       grant-privilege ::=
             DELETE
             | INSERT
             | SELECT
             | UPDATE [( column-identifier [, column-identifier]... )]
25           | REFERENCES [( column-identifier
                 [, column-identifier]... )]

insert-statement ::=
             INSERT INTO table-name [( column-identifier [, column-identifier]...)]
30           VALUES (insert-value[, insert-value]... )

insert-statement ::=
             INSERT INTO table-name [( column-identifier [, column-identifier]... )]
                 { query-specification | VALUES (insert-value [, insert-value]...)}
35
         revoke-statement ::=
             REVOKE {ALL | revoke-privilege [, revoke-privilege]... }
             ON table-name
             FROM {PUBLIC | user-name [, user-name]... }
40           [ CASCADE | RESTRICT ]
             revoke-privilege ::=
                 DELETE
                 | INSERT
                 | SELECT
45               | UPDATE
                 | REFERENCES
```

1001/006

```
     select-statement ::=
         SELECT [ALL | DISTINCT] select-list
         FROM table-reference-list
         [WHERE search-condition]
 5       [order-by-clause]

select-statement ::=
         SELECT [ALL | DISTINCT] select-list
         FROM table-reference-list
10       [WHERE search-condition]
         [GROUP BY column-name [, column-name]... ]
         [HAVING search-condition]
         [order-by-clause]

15   select-statement ::=
         SELECT [ALL | DISTINCT] select-list
         FROM table-reference-list
         [WHERE search-condition]
         [GROUP BY column-name [, column-name]... ]
20       [HAVING search-condition]
         [UNION [ALL] select-statement]...
         [order-by-clause]

select-for-update-statement ::=
25       SELECT [ALL | DISTINCT] select-list
         FROM table-reference-list
         [WHERE search-condition]
         FOR UPDATE OF [column-name [, column-name]...]

30   update-statement-positioned ::=
         UPDATE table-name
         SET column-identifier = {expression | NULL}
             [, column-identifier = {expression | NULL}]...
         WHERE CURRENT OF cursor-name
35
     update-statement-searched
         UPDATE table-name
         SET column-identifier = {expression | NULL }
             [, column-identifier = {expression | NULL}]...
40       [WHERE search-condition]
```

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. Computer interpretable grammatical rules for generating a plurality of queries in a grammar for testing a database engine driver, said grammatical rules comprising:

static elements for generating constant portions of said plurality of queries, wherein said static elements are copied to a buffer associated with a computer to generate said plurality of queries from said grammatical rules; and variable elements selected from at least one of a group consisting of: a query element and a query list element, for generating database engine driver specific portions of said plurality of queries, wherein said variable elements are replaced in said buffer by values specific to a particular database engine driver to generate said plurality of queries from said, grammatical rules.

2. The grammatical rules of claim 1 wherein said query element is enclosed by a start delimiter and an end delimiter.

3. The grammatical rules of claim 2 wherein said start delimiter is a less-than character ("<") and said end delimiter is a greater-than character (">"), and a comma character (",") separates adjacent ones of said plurality of values in said query element.

4. The grammatical rules of claim 1 wherein said query list element is enclosed by a start delimiter and an end delimiter.

5. The grammatical rules of claim 4 wherein said start delimiter is a left square brace character ("["), and said end delimiter is a right square brace character ("]"), and a comma character (",") separates adjacent ones of said plurality of values in said query list element.

6. A computer operable method for testing a database driver, said method comprising:

parsing a meta-language statement into at least one meta-language statement token each comprised of at least one token element where any one of said at least one meta-language statement token that is comprised of more than one token element is a variable token element delimited by a pair of variable token element delimiters and said variable token element is a type selected from at least one of a group consisting of: a query element and a query list element;

expanding said meta-language statement into a plurality of meta-language test queries comprised of one of said plurality of meta-language test queries for each unique combination of said at least one token element in each of said at least one meta-language statement token;

generating a plurality of data type specific test queries from said plurality of meta-language test queries by direct substitution of a data type specific database driver query element for each substitutable one of said at least one token element in each of said plurality of meta-language test queries;

repeating said step of generating for each data type supported by said database driver; and applying said plurality of data type specific test queries to said database driver.

7. A method according to claim 6 wherein said pair of variable token element delimiters for said query element include a less-than symbol ("<") as a start delimiter and a greater-than symbol (">") as an end delimiter, and individual tokens of said query element are separated by a comma symbol (",").

8. A method according to claim 6 wherein said pair of variable token element delimiters for said query list element include a left square brace symbol ("[") as a start delimiter and a right square brace symbol ("]") as an end delimiter, and individual tokens of said query list element are separated by a comma symbol (",").

9. A rule-based test apparatus for generating a plurality of test commands to test a database engine driver, said apparatus comprising:

a memory;

a processor connected to said memory;

a plurality of rules, stored in said memory, wherein each of said plurality of rules is encoded in a meta-language syntax used to represent a plurality of test commands that are executable on corresponding ones of a plurality of database engine drivers; and processing means, operable in said processor, for parsing a meta-language statement input and for generating each of said plurality of test commands according to said plurality of rules and for applying each of said plurality of test commands to said database engine driver.

* * * * *